United States Patent [19]
Pallmann

[11] Patent Number: 5,725,464
[45] Date of Patent: Mar. 10, 1998

[54] METHOD AND APPARATUS FOR THE AUTOMATIC REPLACEMENT OF RIM SHAPED SIZE REDUCTION TOOLS OF SIZE REDUCTION MACHINES, MORE SPECIFICALLY KNIFE RIMS OF WOOD FLAKING MACHINES

[75] Inventor: Wilhelm Pallmann, Zweibruecken, Germany

[73] Assignee: Pallman Maschinenfabrik GmbH & Co.KG, Zweibruecken, Germany

[21] Appl. No.: 650,853

[22] Filed: May 20, 1996

[30] Foreign Application Priority Data

May 19, 1995 [DE] Germany ............... 195 18 354.1

[51] Int. Cl.$^6$ ............... B23Q 3/155
[52] U.S. Cl. ............... 483/1; 29/426.1; 144/172; 144/373
[58] Field of Search ............... 29/426.1, 426.3, 29/26 A, 39; 144/162.1, 172, 373; 483/1, 59

[56] References Cited

U.S. PATENT DOCUMENTS

| | | | |
|---|---|---|---|
| 3,913,643 | 10/1975 | Lambert | 144/172 |
| 4,583,574 | 4/1986 | Pallmann | 144/172 |
| 5,217,424 | 6/1993 | Pallmann | 483/1 |
| 5,313,696 | 5/1994 | Dunne et al. | 29/426.1 |
| 5,525,094 | 6/1996 | Pallmann | 451/45 |

FOREIGN PATENT DOCUMENTS

| | | | |
|---|---|---|---|
| 27 14 575 | 10/1978 | Germany . | |
| 3724171 A | 2/1989 | Germany | 144/172 |
| 38 27 592 | 10/1989 | Germany . | |

*Primary Examiner*—A. L. Pitts
*Assistant Examiner*—Christopher Kirkman
*Attorney, Agent, or Firm*—Foley & Lardner

[57] ABSTRACT

The invention relates to a method and apparatus for the automatic replacement of rim shaped size reduction tools by means of a programmed sequence control which is started according to the present invention when the power consumption of the size reduction machine rises due to the wear of the acting edges. An essential component of the invention is a locking system allowing the automatic engaging and disengaging of the knife rim from its carrying disc. The system consists essentially of three locking bolts fastened on the tool rim and in which catch notches, located behind the carrying disc, the locking nose of the locking unit snaps in being pressed by a spring. To disengage the tool rim, the hydraulically actuable plunger presses the locking unit whereby the locking nose snaps out of the locking bolt so that the forcing spring can now force the tool rim from its carrying disc. Thereby the tool rim is deposited on a pulling carriage which moves it automatically out of the machine housing when the housing door is open. Then it is taken over by a transport hook which transports it automatically to a separate room for overhauling.

7 Claims, 6 Drawing Sheets

METHOD AND APPARATUS FOR THE AUTOMATIC REPLACEMENT OF RIM SHAPED SIZE REDUCTION TOOLS OF SIZE REDUCTION MACHINES, MORE SPECIFICALLY KNIFE RIMS OF WOOD FLAKING MACHINES

FIELD OF THE INVENTION

The invention relates to a method and apparatus for the replacement of rim shaped size reduction tools of size reduction machines, more specifically knife rims of wood flaking machines.

BACKGROUND OF THE INVENTION

The acting edges of rim shaped size reduction tools such as knife rims, grinding and screening tracks are normally exposed to intense wear making it necessary to replace the tools by tools with sharp or resharpened edges at quite short time intervals. As this replacement causes a temporary standstill of the size reduction machine and a corresponding loss of production it is already known from the German Patent 27 14 575 $C_2$ to replace the compact tool rim in case of rim like arranged size reduction tools whereby a pulling carriage is provided in the lower part of the machine housing to facilitate and accelerate the replacement. When the housing door is open and after loosening the tool rim from its carrying element, the two parallel carrying bars of the pulling carriage take over the worn out tool rim and pull it out of the machine housing in axial direction and then pull in the replaced tool rim in reverse direction into the machine housing where it is fastened onto its carrying element arranged in the machine housing.

But this known replacement method has above all the disadvantage that besides the still required time consuming manual work, the necessity of the tool replacement is left to the subjective appreciation of the maintenance personnel, that means that is not determined according to objective wear criterions.

In order to reduce the manual work which has to be done when replacing the tools, a method is already known from the German Patent DE 38 27 592 C1 in which knife cassettes arranged around a knife drum are individually replaced by means of a mechanical auxiliary device as this is done as e.g. for the sugar beets drum slicers. As further known from the German Offenlegungsschrift DE 37 24 171 A1, the respective fastening and loosening of the individual knife cassettes on the knife drum can be done partly automatic by means of locking devices allocated to the cassettes.

As the rapid wear of the acting edges of size reduction tools causes on one hand a distinct deterioration of the quality of the product to be comminuted and on the other hand an increase of the energy necessary for the size reduction, the fact that a necessary replacement of the size reduction tools is not carried out will lead not only to a low quality of the comminuted product but also to a waste of valuable energy.

These disadvantages of the known replacement method are particularly apparent for knife rim flakers. There the flakes produced with blunt knife edges no longer meet the high demands made on them nowadays by the processing industry.

SUMMARY OF THE INVENTION

So it is the object of the invention to provide a sequence of operation of size reduction machines allowing the production of a uniform high quality flake material at constant optimum energy consumption. This means concretely to recognize the necessity of a tool replacement according to objective wear criterions and based on this knowledge to carry it out in a full-automatic way without intervention of maintenance personnel and with negligible loss of production.

Based on the State of the Art as it is documented in the German Patent 27 14 575 $C_2$ this problem is solved by the operation steps defined in claim 1 according to the present invention wherein a programmed sequence control stops the size reduction machine when the energy consumption begins to rise steadily, then loosens the tool rim automatically from its carrying element and pulls it out of the machine on the pulling carriage after the housing has been opened automatically. Then the tool rim is automatically replaced by a reconditoned tool rim which is pulled into the machine automatically and refastened automatically on its carrying element. Then the housing door of the size reduction machine is closed automatically and the machine starts automatically.

As a further embodiment of the invention, according to claim 2, the tool rim pulled out of the size reduction machine is grapsed automatically by a conveying element which transports it automatically to a separate room where its acting edges are reconditioned automatically.

According to a further embodiment of the invention in accordance with claim 3 pressure means are provided for the automatic cleaning of the size reduction tools during the deceleration phase of the size reduction machine.

Elementary prerequisites to carry out the automatic operation sequence defined in the patent claims is the satisfying solution of the key problem, that means the automatic fastening and releasing of the tool rim on/from its carrying element arranged in the machine housing. This problem is perfectly solved by the coupling system according to the present invention and so the way is opened for a full automatic operation sequence.

According to claim 4 of the present invention this coupling system consists of locking mechanisms evenly distributed on the periphery of the tool rim which allows an automatic, sudden fastening and releasing of the tool rim from its carrying element. Thereby, compared to the screwed connections used up to now, it is further particularly advantageous that the interlocking forces at the tool rim act at several, as e.g. on three points, of its periphery simultaneously and evenly so that a distortion of the connecting flanges will not occur.

A particularly tight connection between tool rim and carrying element is achieved according to claim 5 of the invention by the fact that the locking elements are provided with interacting cuneiform surfaces.

Further advantageous embodiments of the invention according to claims 6 and 7 result from special constructional means into which locking mechanisms are integrated to force a tool rim from its carrying element so that according to the invention the forcing off of the tool rim is also done at several points of its periphery simultaneously and evenly.

According to claim 8 especially for rotatable tool rims the permanent magnets on the plungers care for their exact radial alignment with the locking mechanisms arranged on the carrying disc of the tool rim at its standstill.

Further details of the invention are obvious from the drawings and examples of embodiments concerning the particular case of a rotatable knife rim for wood flakers.

BRIEF DESCRIPTION OF THE DRAWINGS

The accompanying drawings illustrating possible embodiments of the invention show in FIG. 1 an axial sectional view of a flaker with a knife rim coupled to the rotatable carrying disc.

DESCRIPTION OF THE PREFERRED EMBODIMENTS

Figure 1:
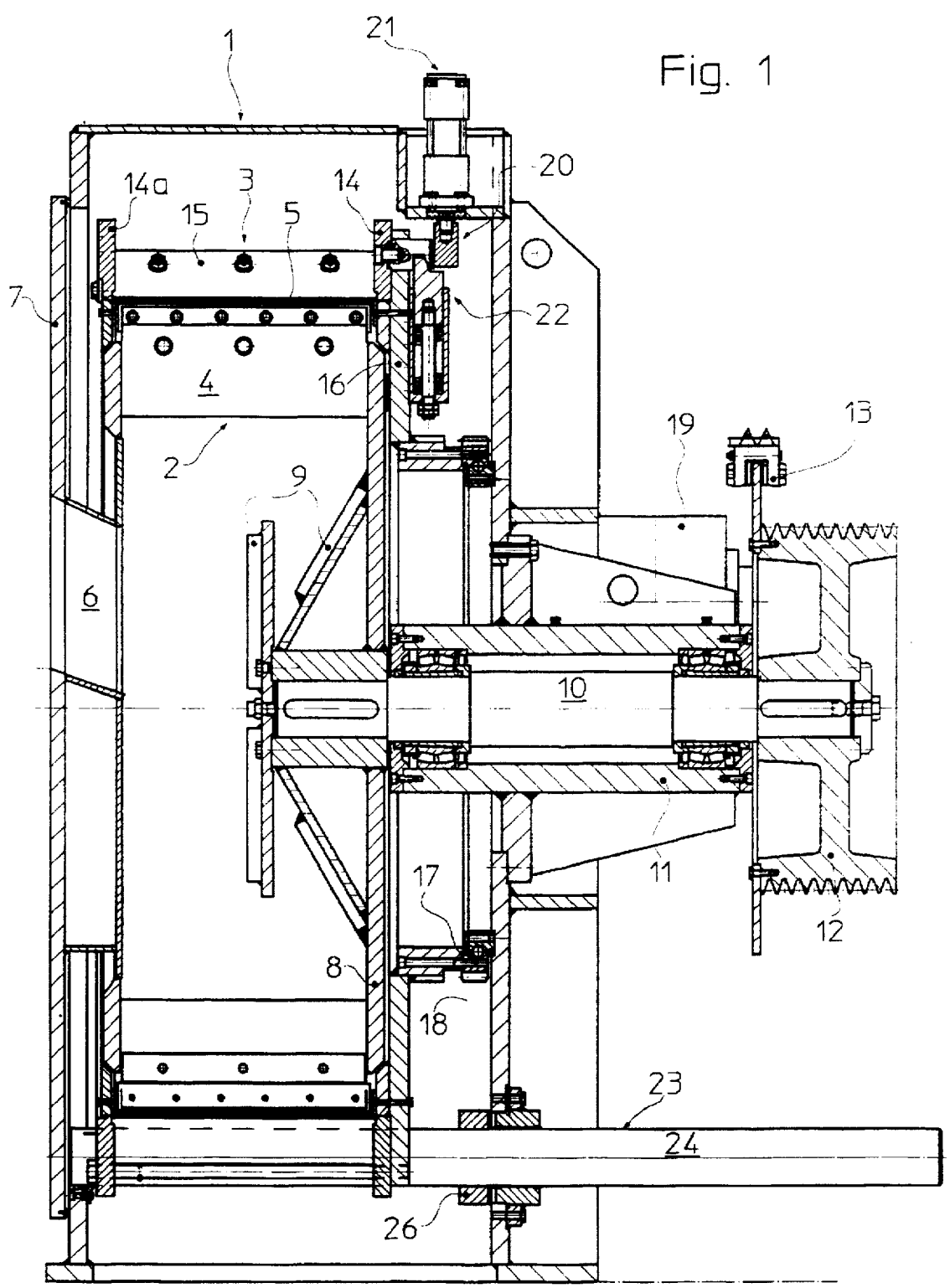

The flaker shown in FIG. 1 consists essentially of a machine housing 1 into which a guiding vane rotor 2 and a rotatable knife rim 3 are arranged.

The guiding vane rotor 2 is equipped with guiding vanes 4 evenly distributed on its periphery. The vanes lead the chips fed into the housing 1 to the knives 5 of the knife rim 3 with high cutting speed. The chips are fed via a feed chute 6 provided at the housing door 7 and then they are evenly distributed on the periphery and width of the guiding vane rotor 2 by the impact ribs 9 provided on the hub disc 8 of the guiding vane rotor 2. The drive shaft 10 connected to the hub disc 8 of the guiding vane rotor 2 is running in a bearing housing 11. The drive shaft 10 is connected to a drive wheel 12 which is equipped with a disc brake 13.

The knife rim 3 consists of two flange rings 14, 14a connected together by several knife holders 15 distributed on the periphery. The inner flange ring 14 serves for the fastening of the knife rim 3 on its carrying disc 16 which in turn is rotating in a roller bearing rim 17 and driven by an angular gear motor 19 via a toothed wheel rim 18.

Figure 2:
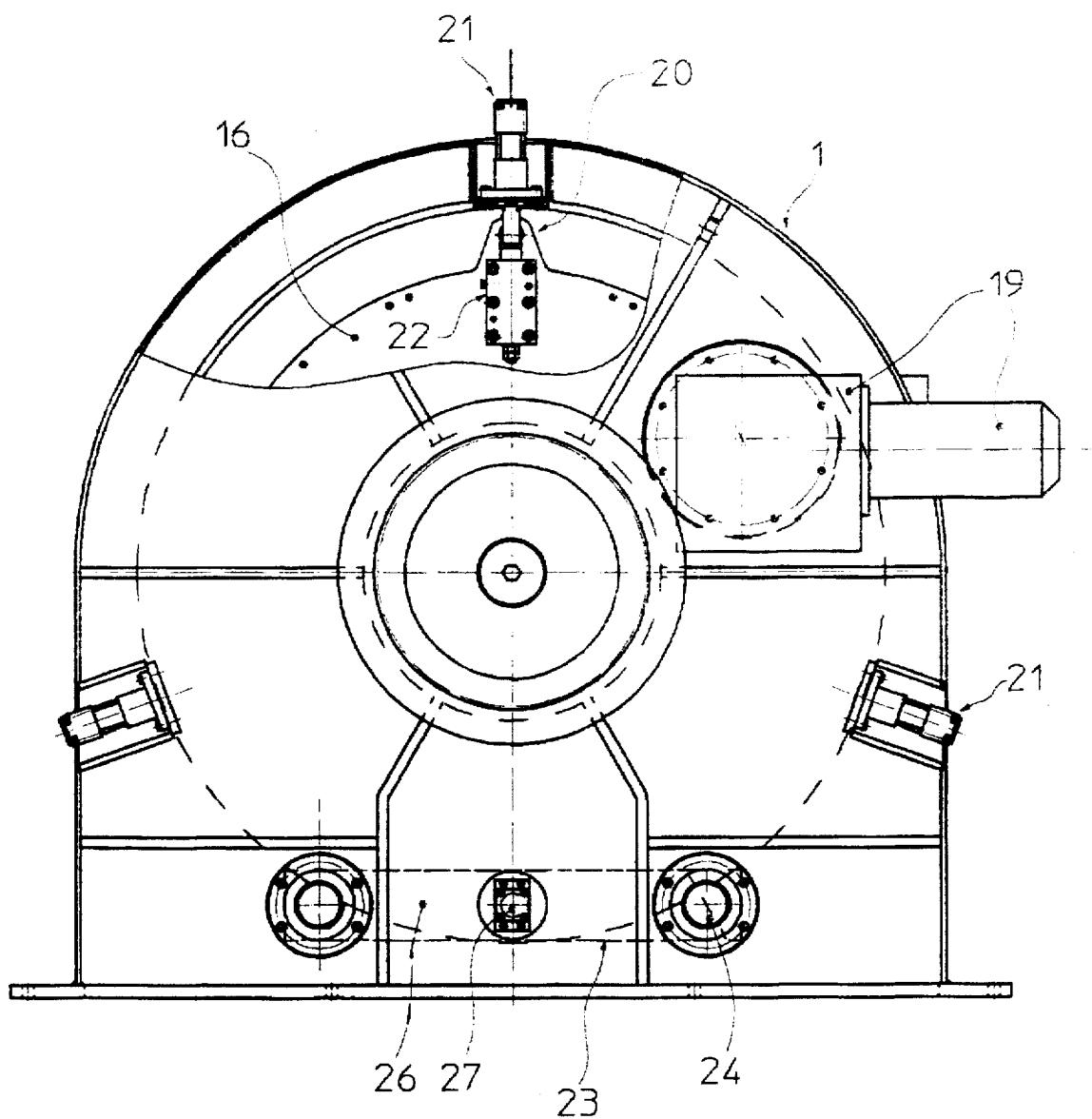
FIG. 2 a rear view of the flaker with partly cut-away section of the rear wall of the housing of the flaker.

As obvious from FIG. 2, three coupling systems 20 which will be explained in detail in the following are evenly distributed on the periphery of the flaker. These coupling systems 20 consist of one stationary pressure unit 21 installed at the machine housing 1 and are interacting at standstill of the knife rim 3 with resp. one locking mechanism 22 arranged on its carrying disc 16 as it will be explained in detail in the following.

In the lower part of the machine housing 1 a carriage 23 slidable in axial direction is provided to move the knife rim 2 in and out. The carriage 23 consists of two slidable carrying bars 24 equipped with respectively two pick-up cams 25 as shown in drawing FIG. 6 corresponding to the axial distance between the flange rings 14 and 14a. Both carrying bars 24 are connected together by means of a tie bar 26 on which a hydraulic drive 27 is acting.

Figure 3:
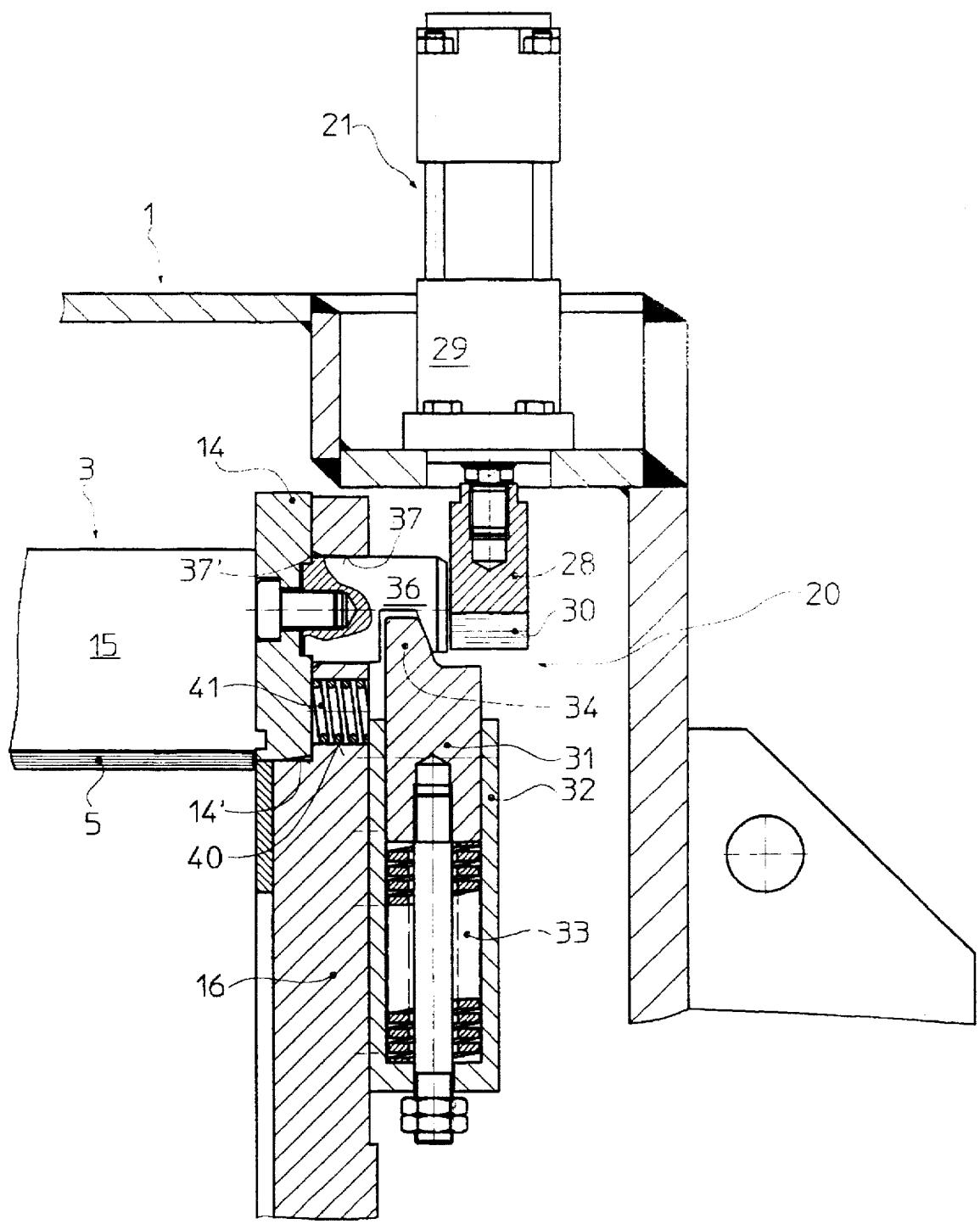
FIG. 3 an enlarged view of the coupling system in locked position designed according to the invention.
Figure 4:
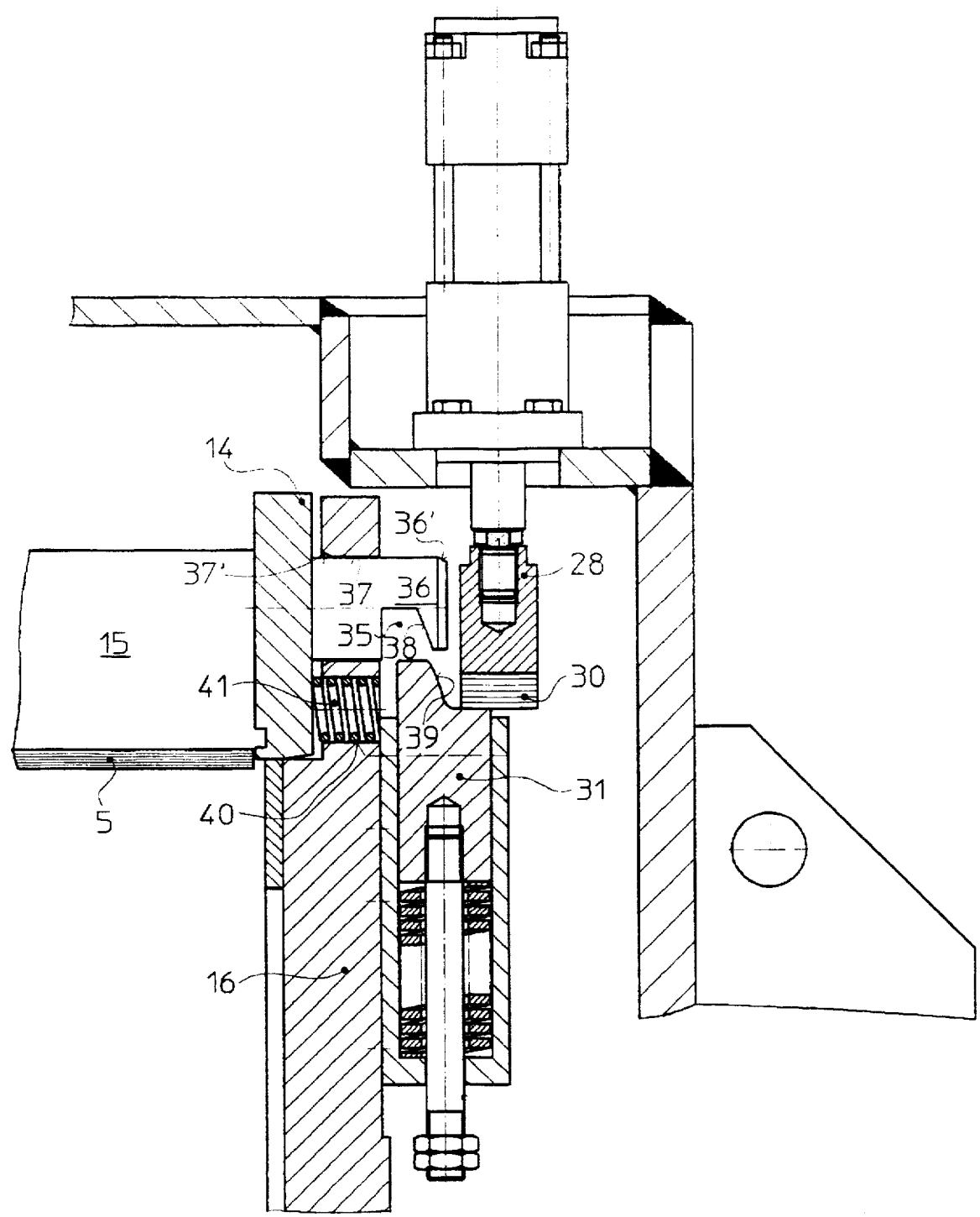
FIG. 4 the same system in unlocked position.

The coupling system 20 shown on an enlarged scale on FIGS. 3 and 4 includes the already mentioned pressure unit 21, whose plunger 28 can be actuated by a hydraulic system 29 and is equipped on its lower side with a permanent magnet 30.

The locking mechanism 22 allocated to each pressure unit 21 consists of a locking unit 31 onto which a sturdy pressure spring 33 is pressing within a slideway 32. At the opposite end it shows a locking nose 34 which snaps into the catch notch 35 of the locking bolt 36 fastened on the interior of the flange ring 14 of the knife rim 3 after the locking bolt 36 has passed in axial direction through its corresponding boring 37 in the carrying disc 16.

To facilitate the passing of the locking bolts 36 through their allocated borings 37 in the carrying disc 16, the locking bolts 36 as well as the borings 37 are provided with corresponding conical sliding surfaces 36' and 37'. The conical sliding surface 14' provided at the interior of the flange ring 14 of the knife rim 3 serves for the same purpose.

The catch notch 35 is provided with a cuneiform surface 38 interacting with the corresponding cuneiform surface 39 provided at the catch nose 34 so that when locking the knife rim 3 it is pressed against its carrying disc 16 at three points of its periphery simultaneously and evenly.

In a recess 40 of the carrying disc 16 a forcing spring 41 is arranged which presses against the inner flange ring 14 of the knife rim 3 and also forces the knife rim 3 from its carrying disc 16 at three points simultaneously and evenly after releasing as shown on FIG. 4.

Figure 5:
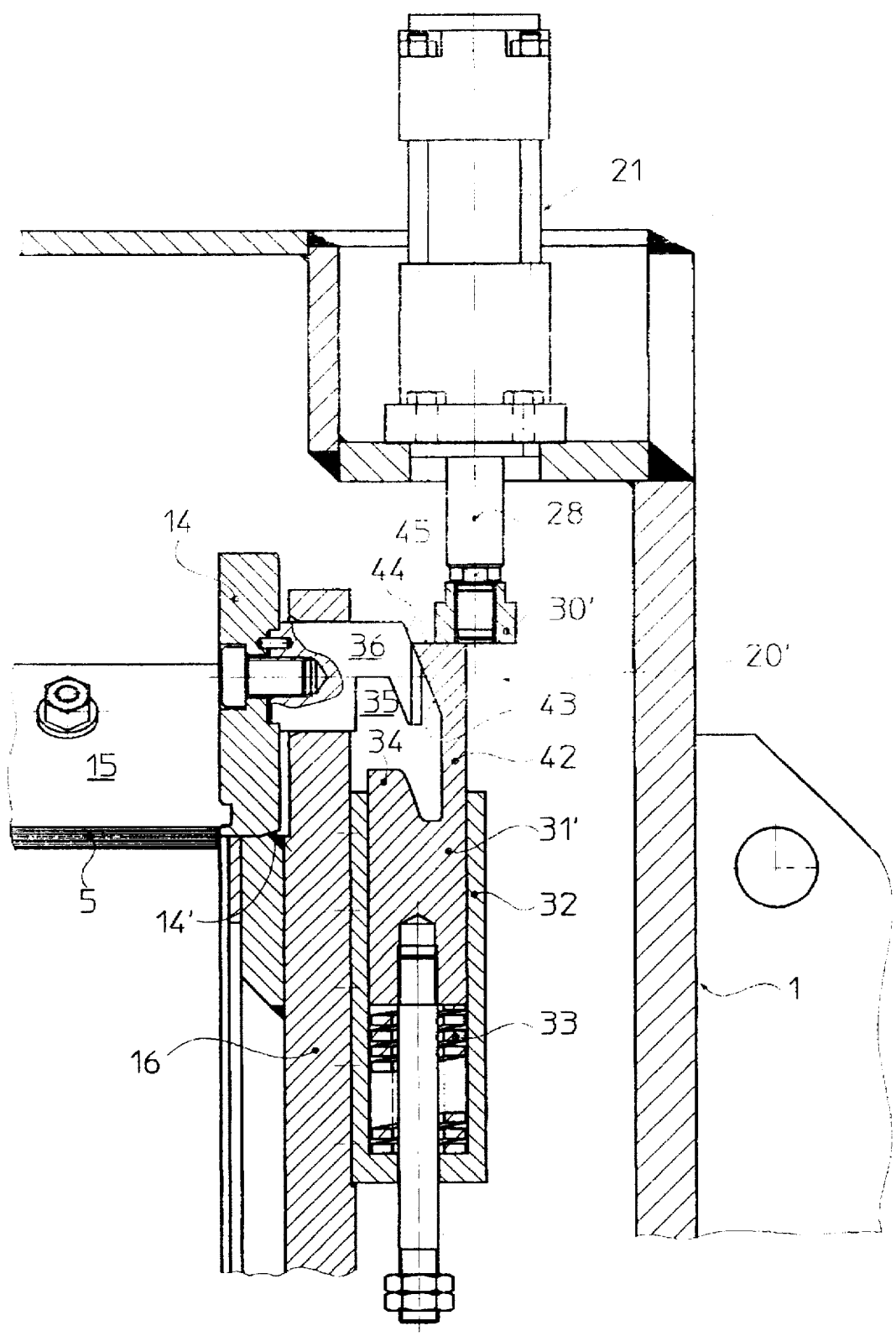
FIG. 5 another coupling system according to the invention, also in unlocked position.

A possible embodiment of the coupling system 20' according to the present invention is shown on FIG. 5. The only difference compared to the previously described coupling system 20 is the different forcing mechanism. In this mechanism the forcing springs 41 in the carrying disc 16 are replaced by a forcing nose 42 at the locking unit 31', said forcing nose protruding radially over the locking nose 34 and provided with a slanted surface 43 interacting with a matching slanted surface 44 provided at the front of the locking bolt 36 and thereby forcing off the knife rim 3 from its carrying disc 16 at three points simultaneously, as illustrated by the forcing off phase shown by FIG. 5. For that purpose the plunger 28 is pressing radially onto the front surface 45 of the forcing nose 42.

FIG. 5 further shows another possible design and another arrangement possibility for the permanent magnets 30' at the plunger 28.

Figure 6:
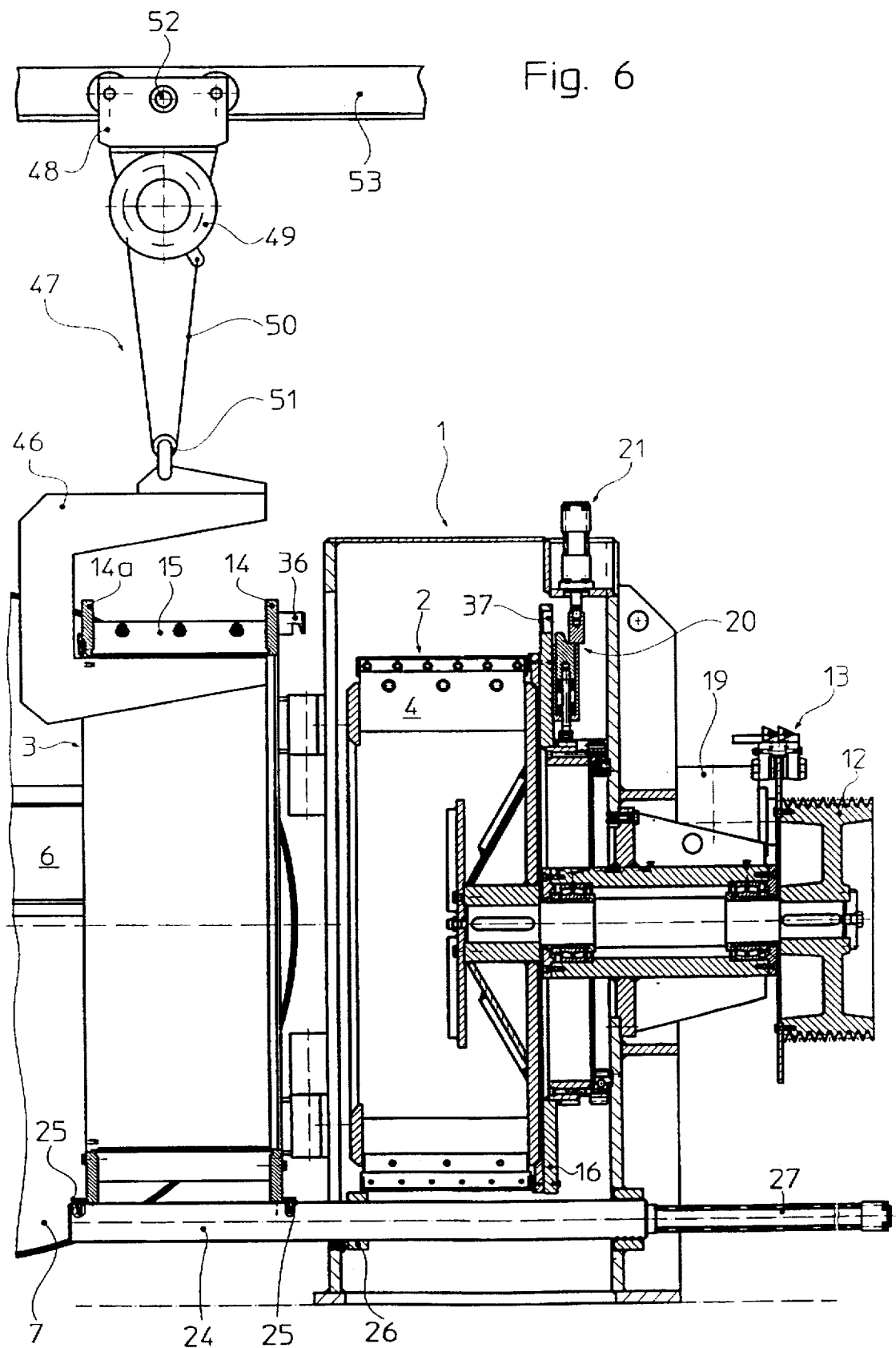
FIG. 6 an axial sectional view of the flaker on a smaller scale with pulled out knife rim.

Finally FIG. 6 shows the knife rim as it is pushed out of the machine housing 1 and still resting on the carrying bars 24 of the pulling carriage 23 while a transport hook 46 is slid into the rim. This hook is part of a transport system 47 consisting of a crane trolley 48 with a hoisting winch 49 whose hauling cable 50 is led over a rope pulley 51 fastened on the transport hook 46. The crane trolley 48 is movable on a suspended rail 53 by means of a motor drive 52.

According to the present invention, the programmed, maintenance free replacement of a worn out knife rim 3 for the above described flaker taken as an example is done as follows:

As with the increasing dullness of the flaking knives the power consumption of the drive motor for the guiding vane rotor 2 rises progressively, said motor stops already when the power consumption begins to rise whereby the disc brake 13 provided at the drive pulley 12 is started at the same time and the angular gear motor 19 for the knife rim 3 is switched off. As its operating speed is considerably lower than the speed of the guiding vane rotor 2 and further the permanent magnets 30, 30' fastened onto the plungers 28 of the three pressure units 21 installed on the periphery of the machine housing 1 exercise a certain braking effect onto the knife rim 3, both rotors come to a standstill at approx. the same time.

During the deceleration phase the knife rim 3 is automatically cleaned by means of special pressure means (air, water, steam).

At standstill of the two rotors 2, 3 said permanent magnets 30, 30' care for the exact radial alignment of the locking mechanisms 22 arranged on the carrying disc 16 of the knife rim 3 with the stationary pressure units 21.

Now the hydraulic system 29 of the three pressure units 21 is activated which presses the plungers 28 of the locking units 31, 31' radially downward towards the interior in opposite direction to the force of their springs 33. Thereby the locking nose 34 snaps out of the catch notch 35 of the locking bolts 36, so that the forcing springs 41 arranged in the carrying disc 16 or alternately the forcing noses 42 at the locking unit 31' force off the knife rim 3 from its carrying disc 16 at three points of its periphery simultaneously and evenly in an advantageous way.

Then the hydraulic drive 27 moves the pulling carriage 23 on whose carrying bars 24 the knife rim 3 is moved out of the machine housing 1 after the housing door 7 had been opened automatically. Outside the machine housing the knife rim 3 is taken over by a stand-by transport hook 46 which lifts it to the required transport height by means of the hauling winch 49 provided at the crane trolley 48 according to a programmed control. When the required transport height is achieved, the drive 52 of the crane trolley 48 starts and the worn knife rim 3 is transported along the suspended rail 53 to the separate room for overhaul. There the individual size reduction tools of the tool rim, as e.g. the knives, are replaced automatically by sharpened knives by means of the automatic replacement device described in the U.S. Pat. No. 5.217.424. Furthermore there is the possibility to resharpen the knives in the knife rim with the sharpening device described in the U.S. patent application, Ser. No. 08/241,161 now U.S. Pat. No. 5,525,094.

In the meantime a stand-by, overhauled knife rim 3 is deposited onto the carrying bars 24 of the pulling carriage 23 by means of a second transport hook 46 so that its locking bolts 36 are aligned with the hereto allocated borings 37 of the carrying disc 16. After activation of the hydraulic device 27 the overhauled knife rim 3 is pulled into the machine housing on the pulling carriage 23 whereby the pick-up cams 25 guarantee that it is safely taken with, especially in the last pulling-in phase.

When the locking bolts 36 penetrate into the borings 37, the knife rim 3 is slightly lifted by the conical sliding surfaces 36' and 37' as well as 14' so that it is loosened from its seat on the carrying bars 24 of the pulling carriage 23 and so can rotate freely.

As soon as the locking bolts 36 pass through the borings 37 in the carrying disc 16, the plungers 28 of the three pressure units 21 are pulled back so that the locking noses 34 snap into the catch notch 35 of the locking bolt 36 due to the force of the pressure springs 33 acting on the locking unit 31, 31'. Thereby the cuneiform surfaces 38, 39 provided at the locking nose 34 and at the catch notch 35 effect the uniform and simulatenous tightening of the knife rim 3 on its carrying disc 16 at three points of its periphery as they interact during the locking. After the automatic closing of the housing door 7, the two drive motors are started automatically.

So the invention allows not only a complete maintenance free operation of size reduction machines but also guarantees a constantly homogeneous high grade product at mostly constant energy consumption without noteworthy impairing the production capacity of the size reduction machine.

It is evident that the invention is not restricted to the described example of a flaker with rotatable knife rim but is usable for all types of size reduction machines with rim-shaped size reduction tools subject to important wear whereby it is of no importance whether the rim-shaped size reduction tools are rotatable or not.

We claim:

1. Method for the replacement of size reduction tools arranged in a rim like manner in size reduction machines, said size reduction tools being removably fastened in a centered way to a carrying element rotatably or fixedly arranged in a machine housing, whereby a worn out tool rim is pulled out of the machine housing in an axial direction when a housing door is open by means of a pulling carriage slidable in the machine housing and then an overhauled tool rim is pulled into the machine housing and be fastened there onto its carrying element, wherein the improvement comprises: a programmed sequence control stops the machine when its power consumption rises, then disengages the tool rim automatically from its carrying element and after automatic opening of the housing door, moves the tool rim out of the machine housing on the pulling carriage where it is automatically replaced by an overhauled tool rim which is automatically engaged to its carrying element after having been pulled into the machine housing whereupon the housing door is automatically closed and the size reduction machine restarts automatically.

2. Method as claimed in claim 1 in which the worn out tool rim pulled out of the machine is transported automatically by a conveying element which transports it automatically to a separate room where its acting edges are automatically resharpened.

3. Apparatus to carry out the method according to claim 1 with a tool rim which is removably fastened with an inner lateral flange ring to a carrying element rotatably or fixedly arranged in the machine housing, wherein the improvement comprises: locking bolts extending axially and distributed on the periphery of the inner flange ring of the tool rim, said locking bolts passing through thereto allocated bores in the carrying element, a radially movable locking nose snapping into a catch notch of each locking bolt behind the carrying element, each said locking nose being part of a locking unit which is fastened on a backside of the carrying element and can be moved in a radial direction against the action of an energy storing device by means of a plunger allocated to each locking unit on the periphery of the machine housing.

4. Apparatus as claimed in claim 3 in which the locking nose and the catch notch of each locking bolt are provided with matching cuneiform surfaces.

5. Apparatus as claimed in claim 3 in which several recesses are distributed on the periphery of the carrying element in which recesses respectively one forcing spring is arranged and acts on the inner flange ring of the tool rim.

6. Apparatus as claimed in claim 3 in which the locking unit is provided with a forcing nose extending radially over the locking nose and having a slanted sliding surface interacting with a slanted surface provided at the front of the locking bolt when disengaging, whereby the front surface of the forcing nose can be pressed radially by the plunger.

7. Apparatus as claimed in claim 3, wherein the size reduction machines have a rotatable tool rim in which the plungers are fastened on the periphery of the machine housing and allocated to the locking units at standstill of the rotatable carrying disc, the plungers are provided each with a permanent magnet.

\* \* \* \* \*